Sept. 22, 1959 E. R. BACKOFEN 2,905,348
INDUSTRIAL TRUCK

Filed May 23, 1957 3 Sheets-Sheet 1

INVENTOR.
ELMER R. BACKOFEN
BY J. Frederick Bechtel
ATTY.

Sept. 22, 1959 E. R. BACKOFEN 2,905,348
INDUSTRIAL TRUCK
Filed May 23, 1957 3 Sheets-Sheet 2

INVENTOR.
ELMER R. BACKOFEN
BY
ATTY.

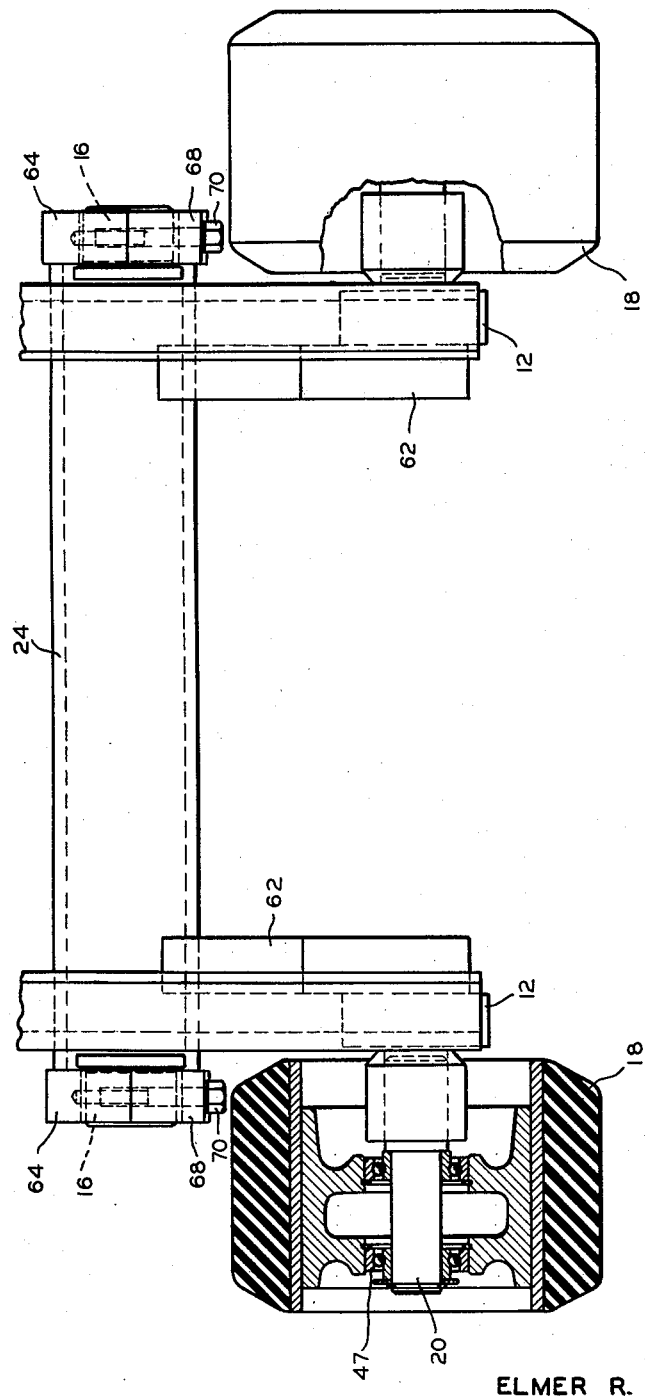

2,905,348

INDUSTRIAL TRUCK

Elmer R. Backofen, Battle Creek, Mich., assignor to Clark Equipment Company, a corporation of Michigan Application May 23, 1957, Serial No. 661,096

4 Claims. (Cl. 214—674)

This invention is directed to lift trucks and more particularly to a lift truck having a load lifting upright assembly which is pivotable intermediate its ends.

Industrial lift trucks have long utilized tiltable load lifting uprights wherein the upright is mounted to pivot about one end thereof. For example, such uprights have heretofore been mounted for pivotal movement on the truck axle housing or on pivot shaft means secured to the frame of the truck.

Given a truck of a specified wheel base and lifting capacity, I have found that by arranging the upright and adjacent ground engaging wheels such that the wheels are mounted upon the upright and are pivotable therewith about an axis intermediate the ends of the upright, the stability of the truck is improved during elevation of a load and the capacity thereof is consequently increased.

It is therefore a primary object of this invention to improve the stability and increase the capacity of certain classes of lift trucks.

It is another object of this invention to so mount an upright and two ground engaging wheels of a lift truck that both the upright and wheels are pivotable together about an axis located intermediate the ends of the upright.

Other objects and advantages of the invention will be apparent from the following detailed description of a preferred embodiment, reference being made to the accompanying drawings, wherein:

Figure 3 is a partial front elevation, with certain parts shown in section, of the truck shown in Figure 1.

Figure 1:
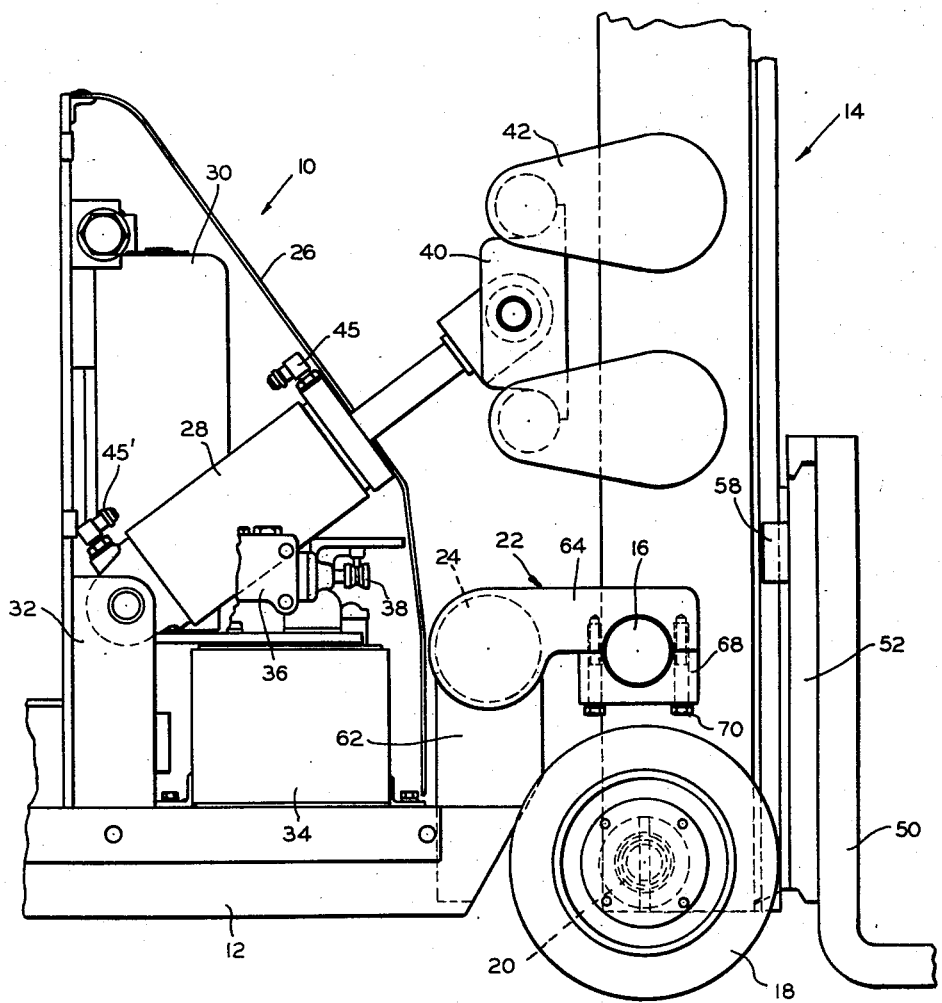
Figure 1 is a partial side view in elevation of an industrial lift truck which embodies my invention.
Figure 2:
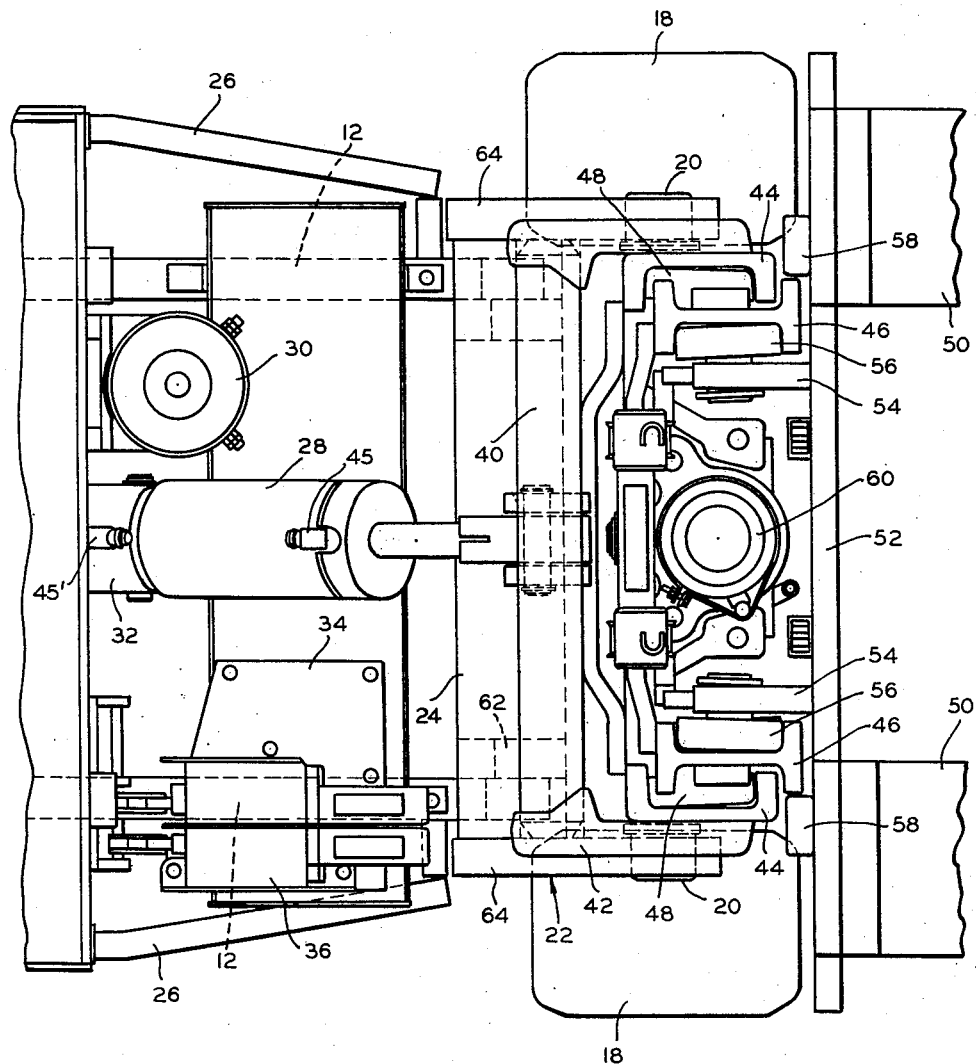
Figure 2 is a plan view, partially in section, of Figure 1.

Referring now to the drawings, the forward portion of an industrial lift truck is shown generally at numeral 10 and comprises longitudinally extending side frame members 12, an upright assembly 14 mounted so as to pivot about aligned axes of a pair of laterally spaced pivot shafts 16 and having a pair of laterally spaced wheels 18 mounted to the lower ends of opposite sides of the assembly 14 by means of a pair of laterally spaced stub axle shafts 20, said upright being connected to the main frame of the truck by means of a pair of laterally spaced bracket means 22 which are connected together by means of a transverse tube 24, and a generally vertically extending compartment 26 in which is housed a tilt cylinder and piston assembly 28, an electric motor and hydraulic gear pump assembly 30, mounting means 32 for the tilt cylinder assembly, an oil sump 34, an operator-controlled hydraulic control valve means 36 and a motor switch actuator cam 38. The motor and pump assembly 30 and associated parts form no part of the present invention and so are not described in detail herein.

The rear end of the machine, not shown, includes operator control means and a single steer-drive wheel located centrally of the truck.

The frame members 12 of the truck and associated frame members, and the body compartment 26 together may be said to comprise the truck chassis.

The cylinder assembly 28 is pivotally connected at its cylinder end to the bracket 32 and at its piston rod end to a transversely extending upright strengthening member 40, which extends between a pair of rearwardly extending members 42 secured to a pair of transversely spaced channel members 44 of the upright assembly 14. Hose connecting means 45 and 45' are located adjacent opposite ends of the cylinder means and are adapted to have connected thereto hydraulic pressure hoses for communicating fluid under pressure with an operator selected one or the other ends of the cylinder means to effect a tilting in one direction or the other of the upright assembly 14 and parts associated therewith.

The upright assembly 14 generally comprises the pair of fixed channel members 44 to which are rotatably secured adjacent the lower ends thereof the wheels 18 on the stub shafts 20. The stub shafts 20 are secured at their inner or facing ends to opposite lower portions of the outer surfaces of channel members 44. Each wheel 18 is mounted for rotation upon a bearing member 47 which is located intermediate each axle 20 and the respective wheel. Nested within the channel members 44 for vertical movement relative thereto are a pair of transversely spaced I-beam members 46, between which and the channel members 44 are located a plurality of cocked rollers 48 for stabilizing and guiding the I-beam members 46 in the channel members 44. A pair of forwardly extending load engaging forks 50 are connected to a fork carriage 52 which is mounted for elevating movement within the I-beams 46 by means of brackets 54 and cocked rollers 56. A pair of side thrust rollers 58 are connected to the fork carriage 52 and are adapted to ride the outer surface of the forwardly located flange of each I-beam 46. An hydraulic hoist 60 is mounted in the upright and is connected to the fork carriage and vertically movable I-beam 46 by means of a chain and sheave or sprocket arrangement, not shown. The detailed construction of the upright assembly 14 does not form a part of this invention it being disclosed and described in the copending application U.S. application Serial No. 589,156 of Russell Hastings, Jr. and Elmer R. Backofen, filed June 4, 1956.

The connecting bracket means 22 between the truck frame and the upright assembly 14 comprises a pair of laterally spaced vertically extending arms 62 and a pair of forwardly extending arms 64 which are interconnected by the transverse tube member 24. The pivot shafts 16 are secured at their inner or facing ends to the outer surfaces of channel members 44 of upright 14 and mount the forward ends of members 64 by means of a pair of bracket members 68 which are connected to the members 64 by means of bolts 70.

If pressure fluid is introduced into the right hand end of cylinder assembly 28 the piston rod of the assembly will be retracted and cause the entire upright assembly 14 above pivot shafts 16 to be tilted rearwardly about said shafts, whereas the wheels 18 and that portion of the upright structure below the pivot shafts 16 will be extended forwardly thereof. Whenever a given load is engaged by the forks 50 for elevation on the upright 14 and transport to a given location, it will be understood that the effect of tilting the major portion of the upright and load in a rearward direction while projecting the lower portion of the upright and the wheels 18 in a forward direction (about pivot shafts 16) will effect a lengthening of the wheel base of the truck, thereby increasing its stability in operation. Of course, the location of the pivot shafts 16 in a vertical direction can be altered as desired, and as the vertical distance between the stub axles 20 and the pivot shafts 16 increases, within limits, the stabilizing effect resulting from a counterclockwise tilt of the upright, as seen in Figure 1, will be increased. Whenever the upright assembly is tilted forwardly with extension of the piston rod of cylinder assembly 28, the upper portion thereof moves in a clockwise direction about pivot shafts 16 (Figure 1) while the wheels 18 are retracted. The transversely extending tube 24 aids in rigidifying bracket assemblies 22.

From the above it will be seen that I have provided a pivoted upright structure for industrial lift trucks which enables increased stability thereof during operation with a given load. Although only one embodiment of the invention is shown and described herein, it will be apparent to persons skilled in the art that modifications may be made in the design and arrangement of the parts without departing from the scope of the invention.

I claim:

1. In an industrial lift truck having a chassis, an upright assembly mounted forwardly of the chassis, a pair of transversely spaced pivot members extending outwardly in opposite directions from opposite sides of said upright and located intermediate the ends thereof, a pair of transversely spaced oppositely extending stub shafts connected to the opposite sides of said upright assembly at a location below the said pivot members, a pair of wheels mounted for rotation on said stub shafts and adapted to support the upright at all times, means connecting said pivot members to the truck chassis, and cylinder means supported by the chassis at one end thereof and connected to the upright assembly at the opposite end thereof at a location above the said pivot member such that energization of the cylinder means in one direction effects rearward tilting movement of the upright portion above the pivot members and opposite movement of the upright portion and wheels below said pivot members.

2. In an industrial truck having a chassis, a telescoping upright assembly, load engaging means mounted in said upright assembly for elevating movement relative thereto, hoist means mounted in said upright assembly for raising and lowering the load engaging means relative thereto, connecting means secured to the chassis and to the upright assembly intermediate the ends thereof for permitting pivotal movement of said upright assembly about the axis of said intermediately located connecting means, a pair of transversely spaced ground engaging wheels rotatably mounted adjacent the lower ends of the opposite sides of said upright assembly and below said intermediate connecting means, and upright tilting means connected to the upright assembly above said intermediate connecting means and to a portion of said truck for rotating said upright assembly and wheels in either direction about said intermediately located connecting means.

3. In an industrial truck having a chassis, bracket means extending upwardly and forwardly from the forward end of said chassis, a telescoping upright assembly pivotally mounted at the forward end of said bracket means, a pair of wheels adapted for continuous engagement with the ground or other truck supporting means rotatably mounted adjacent the lower ends of the opposite sides of said upright and below the connections of said upright to said bracket means, and tilting means connected at the one end thereof to said upright above the connection of said upright to said bracket means and at the other end thereof to a portion of the truck, whereby energization of the tilting means effects movement of the upright portion above the said bracket means in a direction opposite to the direction of movement of the portion of the upright below said bracket means.

4. An industrial truck as claimed in claim 3 wherein said bracket means comprises a pair of generally inverted L-shaped members connected to opposite sides of the upright and interconnected by a transversely extending member, said tilting means effecting an increase in the wheelbase of the truck when energized to rearwardly tilt the upright.

References Cited in the file of this patent
UNITED STATES PATENTS

| | | |
|---|---|---|
| 1,887,134 | Johancen et al. | Nov. 8, 1932 |
| 2,320,601 | Howell | June 1, 1943 |
| 2,494,505 | Bouchard | Jan. 10, 1950 |
| 2,623,653 | Framhein | Dec. 30, 1952 |